US006703556B2

(12) United States Patent
Darveniza

(10) Patent No.: US 6,703,556 B2
(45) Date of Patent: Mar. 9, 2004

(54) MOBILE LIGHTNING PROTECTION

(76) Inventor: Mat Darveniza, PO Box 385, Indooroopilly (AU), 4069

( * ) Notice: Subject to any disclaimer, the term of this patent is extended or adjusted under 35 U.S.C. 154(b) by 0 days.

(21) Appl. No.: 09/850,473

(22) Filed: May 7, 2001

(65) Prior Publication Data

US 2002/0162671 A1 Nov. 7, 2002

(51) Int. Cl.$^7$ .............................. H02G 13/00; H05F 3/02
(52) U.S. Cl. ................................ 174/3; 174/6; 361/219
(58) Field of Search ............................. 174/1, 2, 3, 4 R, 174/5 R, 5 SG, 6, 7, 10; 180/271; 361/219

(56) References Cited

U.S. PATENT DOCUMENTS

| | | | | |
|---|---|---|---|---|
| 907,104 A | * | 12/1908 | Brower | 361/219 |
| 1,189,565 A | * | 7/1916 | Hartsaw | 174/2 |
| 1,744,004 A | * | 1/1930 | Hunt | 361/217 |
| 1,999,414 A | * | 4/1935 | King | 361/219 |
| 2,084,523 A | * | 6/1937 | Crawford | 361/219 |
| 2,125,378 A | * | 8/1938 | Kadas | 361/219 |
| 2,216,363 A | * | 10/1940 | Crawford | 361/219 |
| 2,280,327 A | * | 4/1942 | Ware | 361/219 |
| 2,318,340 A | * | 5/1943 | Thacher et al. | 361/219 |
| 2,502,496 A | * | 4/1950 | Wickman | 361/219 |
| 2,521,337 A | * | 9/1950 | Brummer | 361/219 |
| 2,524,163 A | * | 10/1950 | Criss | 361/219 |
| 2,728,032 A | * | 12/1955 | Foltz | 361/219 |
| 2,753,491 A | * | 7/1956 | Legge | 361/219 |
| 2,858,482 A | * | 10/1958 | Nutter | 361/216 |
| 2,985,799 A | * | 5/1961 | Steele | 361/219 |
| 3,869,836 A | * | 3/1975 | Allen | 361/219 |
| 3,894,608 A | * | 7/1975 | Haenle | 180/271 |
| 4,321,653 A | * | 3/1982 | Takahashi | 361/219 |
| 4,763,383 A | * | 8/1988 | Estkowski et al. | 361/219 |
| 5,798,482 A | * | 8/1998 | Reeves | 174/2 |

* cited by examiner

Primary Examiner—Dean A. Reichard
Assistant Examiner—Adolfo Nino
(74) Attorney, Agent, or Firm—J. D. Harriman, II, Esq.; Coudert Brothers LLP

(57) ABSTRACT

The present invention provides a method and apparatus for mobile lightning protection. In one embodiment of the present invention, a lightning interception rod is positioned above a vehicle. In one embodiment, the rod connects to four down-conductors to conduct the current supplied by the lightning towards the ground. In one embodiment, the four down-conductors are positioned in a rectangular configuration. In one embodiment, down-conductors are covered by a insulating material. In one embodiment, the insulating material is a 3 mm thick layer of polymer. In one embodiment, one or more chains are attached to the vehicle and allowed to contact the ground. In one embodiment, two chains are attached to the vehicle. One chain is positioned at the front of the vehicle and another chain is positioned at the back of the vehicle.

30 Claims, 10 Drawing Sheets

MOBILE LIGHTNING PROTECTION

BACKGROUND OF THE INVENTION

1. Field of the Invention

The present invention relates to the field of lightning protection, and in particular to a method and apparatus for mobile lightning protection.

2. Background Art

Some vehicles are designed with sufficiently sized and proportioned metal frames, or metal skins, to protect occupants against the effects of lightning strikes. This is not typically a design goal of the vehicle. Rather it is one inherent and unintended result of the metal skin forming an approximation of a Faraday cage around the occupant. Other vehicles lack such protection. Prior art methods of insuring occupant protection are prohibitive in some applications due to size, weight and cost concerns. This problem can be better understood by a review of basic electricity of relevance to lightning protection.

Basic Electricity of Relevance to Lightning Protection

The passage of electricity through matter is caused by an electrical potential difference between two points. It causes electrical current to flow from one point to the other. The potential difference is termed the voltage and is measured in volts. In electrical engineering, one point is typically designated as a common reference for voltage and is called the "common" or "ground". It is said to have a voltage of zero, and the voltage at any other point is the potential difference between it and ground. Electrical current is measured in amperes.

When a constant voltage is applied between two points, the magnitude of the current that flows depends on the resistance of material between them. This is called resistive current. The resistance is the voltage divided by the current and is measured in ohms. One ohm is one volt divided by one ampere. If the resistance is very low, the material is said to be a good conductor. Metals are good conductors and typically have resistances much less than one ohm. If the resistance if very high, for example much greater than one million ohms, the material is an insulator. Air and solid polymers are good insulators.

When current flows through a conductor, a potential difference is developed between points along its length. This difference in potential is termed a voltage drop. If the current is constant in magnitude, the voltage drop equals the product of the current and the resistance, and it is called the resistive voltage drop. If the current magnitude varies with time, there is an additional voltage drop equal to the product of the rate of change of current and the inductance. This additional voltage drop is termed the inductive voltage drop. For lightning currents flowing through good conductors, the inductive voltage drop is always very much larger than the resistive voltage drop.

The application of constant voltage to a good insulator normally causes very little current to flow through it. However, if the voltage is increased to a very large value, an electrical discharge arc occurs. It then becomes a very good conductor and so very large discharge current flows through the arc in what was preciously an insulator. There is also another mechanism by which a small but significant current can flow through an insulator at voltages less than the discharge voltage. If the applied voltage varies with time, there is an additional current equal to the product of the rate of change of voltage and the capacitance. For voltages caused by lightning currents and good insulators, this capacitive current is always much larger than the resistive current.

The fundamental parameter which controls the flow of current through materials is the electric field. The average electric field is the applied voltage divided by the length of the material and so is measured in volts per meter. In a metallic conductor, the electric field is low, but it still has sufficient magnitude to impose a drift velocity on the free electrons that normally move at random in the metal, rather like a gas confined in a container. The drift imposed by the electric field is the source of the current flow through the conductor. In contrast, the material of a good insulator has no free electrons and that is why there is very little resistive current flow when normal voltage is applied. However, if the voltage is increased sufficiently to cause a discharge, the electric field becomes large enough to detach large numbers of electrons from the insulator's atoms and molecules. These are now free electrons and so create the conducting discharge arc.

There is another fundamental parameter associated with the flow of electric current in a good conductor. It is the magnetic field. If the current is constant in magnitude, the magnitude of the magnetic field that surrounds the conductor is constant, much like that produced by a magnet. However, if the current varies with time, the magnetic field also varies with time. Such a time-varying magnetic field will induce a voltage in the materials that surround the conductor. If the surrounding material is also a conductor, the inducted voltages will cause circulating currents to flow in it. For lightning currents, the rates of change of current and of magnetic field are very large, and so the magnitudes of induced circulating currents will be significant. These circulating currents can be harmful to people who are close to the lightning current.

Lightning Protection

Lightning occurs when there is charge separation and positive and negative electrical charges accumulate in different parts of a cloud, like a giant battery. When the difference in electrical potential between and area of a cloud and the ground is great enough, an electrical current will arc through the air to neutralize these charges. Lightning produces an electrical discharge and results in a large current arc. Since relatively small amounts of current passing through a human being causes injury or death, it is desirable to protect against the very large currents caused by lightning strikes passing through the human body.

In some vehicles (e.g., cars and trucks), people inside the vehicle are protected against lightning strikes. Lightning strikes the vehicle, passes through the metal skin and frame of the vehicle and travels to the ground through the tires without passing through the passengers of the vehicle. The resistance of air is high enough to make the air an effective insulator if the electric field inside the vehicle is small. The mostly enclosed metal skin of the vehicle acts approximately like a Faraday cage. A Faraday cage is a conductive sphere. Inside a conductive sphere, there can be no electrical or magnetic fields. The skin of a car is neither completely enclosed nor a sphere. However, it is close enough to approximate a Faraday cage that the electric and magnetic fields inside the car are relatively small. Thus, the current does not arc to the occupants of the vehicle. Instead, the current passes through the conductive skin of the vehicle to the ground.

Some vehicles (e.g., golf carts) are not sufficiently enclosed to approximate a Faraday cage and do not provide a safe path for current to flow to ground during lightning strikes. Lightning strikes to such vehicles can arc to a passenger either directly or by a "side-flash" from some part of the vehicle. Additionally, strong and abrupt changes in electromagnetic fields are present in the vehicles. These fields are believed to have harmful effects on passengers.

One prior art solution is to increase the size of the frame to make the vehicle more enclosed. However, a more enclosed vehicle design is undesirable for vehicles such as golf carts because it would add expense, increase difficulty boarding and exiting the vehicle and unacceptably increase the weight and cost of the vehicle.

SUMMARY OF THE INVENTION

The present invention provides a method and apparatus for mobile lightning protection. In one embodiment of the present invention, a lightning interception rod is positioned above a vehicle. The rod is designed to intercept lightning before it strikes the vehicle. In one embodiment, the rod connects to four down-conductors to conduct the current supplied by the lightning towards the ground. One fourth of the total current supplied by the lightning flows through each down-conductor. Since each down-conductor carries less current than the total lightning strike, the voltage drop is smaller and so a passenger can be closer to each down-conductor without generating a side-flash than if the total lightning strike passed through only one down-conductor.

In one embodiment, the four down-conductors are positioned in a rectangular configuration. One down-conductor is positioned on the right side of the front of the vehicle. A second down-conductor is positioned on the left side of the front of the vehicle. A third down-conductor is positioned on the right side of the back of the vehicle, and a fourth down-conductor is positioned on the left side of the back of the vehicle. In this configuration, the down-conductors are located at a safe distance from a typical passenger. Additionally, the magnetic fields generated by the flow of current through the down-conductors act against each other. Thus, the magnitude of the magnetic field at locations inside the vehicle is reduced or eliminated, as are its harmful effects on the passenger.

In one embodiment, down-conductors are covered by a insulating material. The insulating material allows passengers to be closer to the down-conductors without a side-flash occurring. In one embodiment, the insulating material is a layer of polymer of at least 3 mm thickness.

In one embodiment, one or more chains are attached to the vehicle and allowed to contact the ground. The chains provide a path for current from the lightning strike to reach ground. In one embodiment, two chains are attached to the vehicle. One chain is positioned at the front of the vehicle and another chain is positioned at the back of the vehicle.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for mobile lightning protection. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Figure 1:
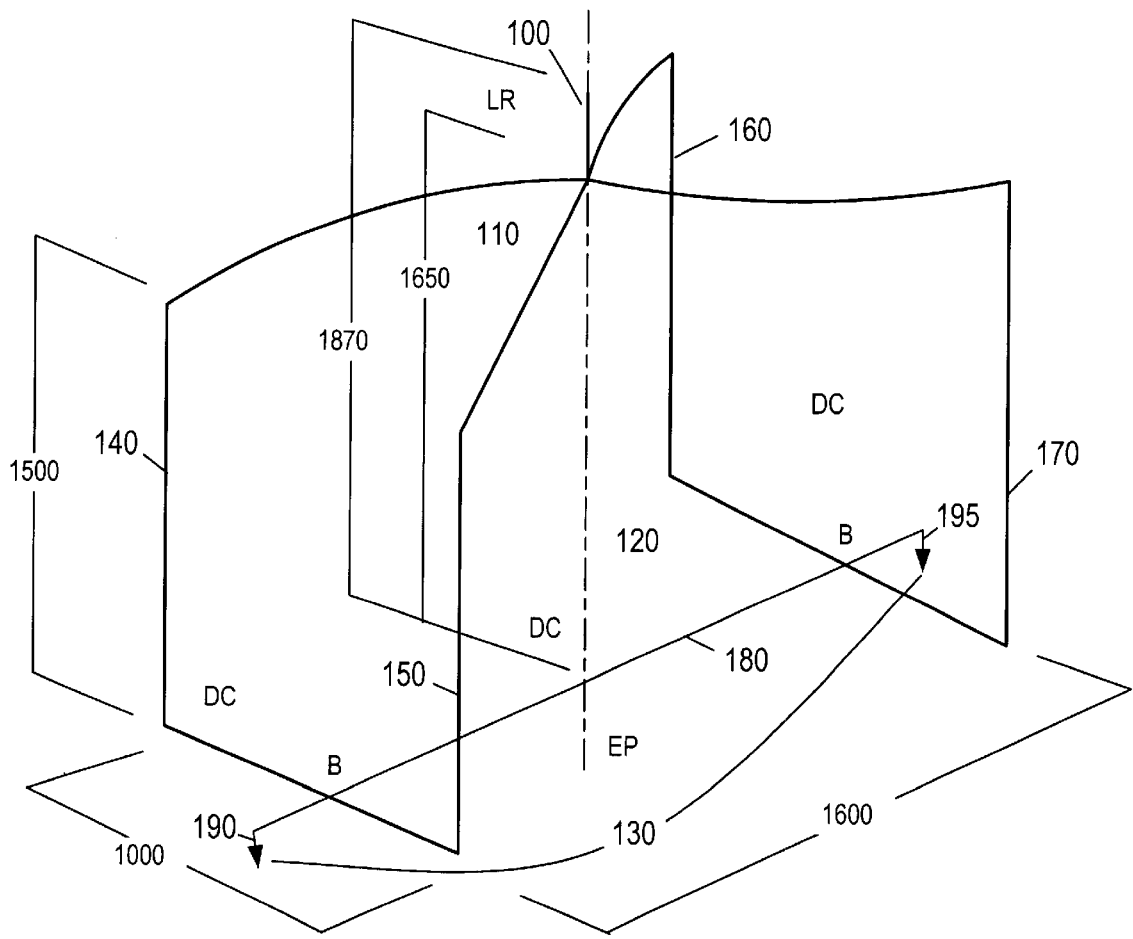
FIG. 1 is a block diagram of a mobile lightning protection system in accordance with one embodiment of the present invention.

In one embodiment of the present invention, a lightning interception rod is positioned above a vehicle. The rod is designed to intercept lightning before it strikes the vehicle. FIG. 1 illustrates a mobile lightning protection system in accordance with one embodiment of the present invention. The lightning rod (100) is positioned above the space occupied by the vehicle (110) and maintains a safe distance from the space (120) typically occupied by passengers. The lightning interception rod is attached to the vehicle by down-conductors. The down-conductors are positioned a safe distance from the area typically occupied by passengers and conduct the current supplied by the lightning towards the ground (130).

In one embodiment, the rod connects to four down-conductors to conduct the current supplied by the lightning towards the ground. One fourth of the total current supplied by the lightning flows through each down-conductor. Since each down-conductor carries less current than the total lightning strike, the voltage drop is smaller and so a passenger can be closer to each down-conductor without generating a side-flash than if the total lightning strike passed through only one down-conductor.

The embodiment of FIG. 1 is a mobile lightning protection system with four down-conductors. The lightning rod is positioned above the space occupied by the vehicle and maintains a safe distance from the space typically occupied by passengers. The lightning interception rod is attached to the vehicle by down-conductors 1 (140), 2 (150), 3 (160) and 4 (170). The down-conductors are positioned a safe distance from the area typically occupied by passengers and conduct the current supplied by the lightning towards the ground.

In one embodiment, the four down-conductors are positioned in a rectangular configuration. One down-conductor is positioned on the right side of the front of the vehicle. A second down-conductor is positioned on the left side of the front of the vehicle. A third down-conductor is positioned on the right side of the back of the vehicle, and a fourth down-conductor is positioned on the left side of the back of the vehicle. In this configuration, the down-conductors are at a safe distance from a typical passenger. Additionally, the magnetic fields generated by the flow of current through the down-conductors act against each other. Thus, the magnitude of the magnetic field at locations inside the vehicle is reduced or eliminated, as are its harmful effects on the passenger.

Figure 2:
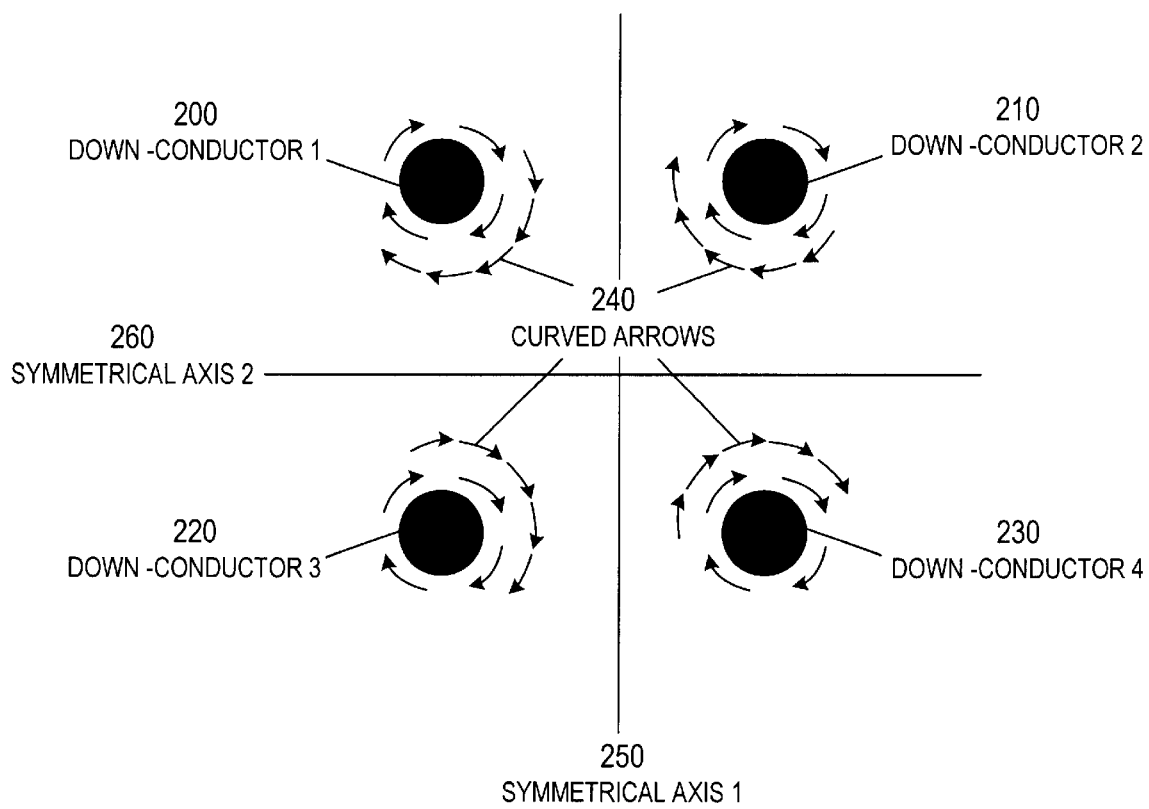
FIG. 2 is a block diagram of a top view of the magnetic field inside a vehicle during a lightning strike in accordance with one embodiment of the present invention.

FIG. 2 illustrates a top view of the magnetic field inside a vehicle during a lightning strike in accordance with one embodiment of the present invention. The current from the lightning strike is passed through down-conductors 1 (200), 2 (210), 3 (220) and 4 (230). The current generates a magnetic field around each down-conductor represented in FIG. 2 by several curved arrows (240). These magnetic fields are all directed in a clockwise direction around each down-conductor. At locations between two down-conductors, the magnitude and direction of the magnetic fields generated by the down-conductors oppose each other. Thus, the total magnetic field is reduced or completely eliminated at these locations. The magnetic field is eliminated along symmetrical axis 1 (250) and symmetrical axis 2 (260).

In one embodiment, down-conductors are covered by an insulating material. The insulating material allows passengers to be closer to the down-conductors without a side-flash occurring. In one embodiment, the insulating material is a layer of polymer of at least 3 mm thickness.

In one embodiment, a passenger of the vehicle is able to rest both feet on an equi-potential object. Thus, no current passes through the passenger between the two locations of the passenger's feet. In one embodiment, the equi-potential object is the chassis of the vehicle. The embodiment of FIG. 1 illustrates an equi-potential object (180) which connects to all four down-conductors. In another embodiment, an insulating material is placed between the equi-potential object and the passenger and so reduces capacitive currents. In one embodiment, the insulating material is a layer of polymer of at least 3 mm thickness.

In one embodiment, one or more flexible conductors are attached to the vehicle and allowed to contact the ground. In one embodiment, the flexible conductors are chains. The chains are connected to a conductor which, in turn, is connected to the down-conductors. In one embodiment, the chassis of the vehicle is the conductor which connects the chains to the down-conductors. The chains provide a path for current from the lightning strike to reach ground.

In the embodiment of FIG. 1, two chains are attached to the vehicle. One chain (190) is positioned at the front of the vehicle and another chain (195) is positioned at the back of the vehicle. Both chains are allowed to drag along the ground to complete the connection between the lightning rod and the ground. Regardless of the number of chains in an embodiment, chains should be positioned to provide a sufficient level of symmetry to cancel resulting electromagnetic fields.

Figure 3:
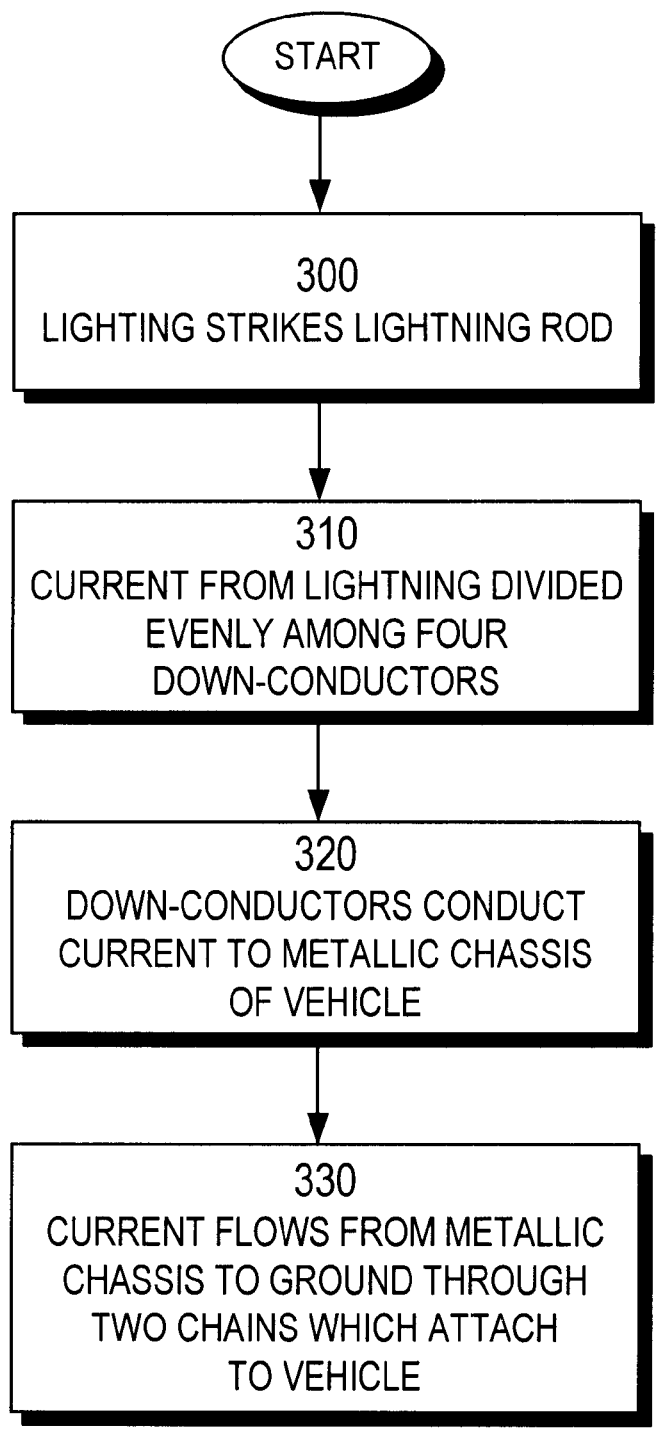
FIG. 3 is a flow diagram of the process of mobile lightning strike protection in accordance with one embodiment of the present invention.

FIG. 3 illustrates the process of mobile lightning strike protection in accordance with one embodiment of the present invention. At step 300, lightning strikes a lightning interception rod. At step 310, the current from the lightning is divided evenly among four down-conductors. At step 320, the down-conductors conduct the current to a metallic chassis of the vehicle. At step 330, the current flows from the metallic chassis to the ground through two chains which attach to the vehicle.

In one embodiment, the chains are detachable. Thus, the chains are removed when the possibility of a lightning strike is determined to be sufficiently low. When a lightning strike is determined to be sufficiently likely, the chains are attached to the vehicle's chassis. In one embodiment, the lightning rod is detachable. Thus, the lightning rod is removed when the possibility of a lightning strike is determined to be sufficiently low. When a lightning strike is determined to be sufficiently likely, the lightning interception rod is attached to the vehicle's down-conductors.

In another embodiment, a portion of each down-conductor is detachable. The portion of the down-conductor which attaches to the lightning rod can be detached from the portion of the down-conductor which attached to the equi-potential object. In one embodiment, the vehicle is a golf cart. The equi-potential object is the chassis of the golf chart. The four metal poles which support the roof of the golf cart are portions of four down-conductors which attach to the chassis. A conductor is attached to each pole individually, and these four conductors are joined where they attach to a lightning rod. Thus, the conductors are portions of down-conductors which attach to the lightning rod.

In one embodiment, the lightning rod is a conductive object that extends vertically above the vehicle. In another embodiment, the lightning rod is a conductive rod that extends vertically above the vehicle. In other embodiments, the lightning rods are other shapes. For example, in one embodiment, the lightning rod is an oval-shaped, conductive display which shows a logo.

Thus, a method and apparatus for mobile lightning protection is described in conjunction with one or more specific embodiments. The invention is defined by the following claims and their full scope and equivalents.

Figure 4:
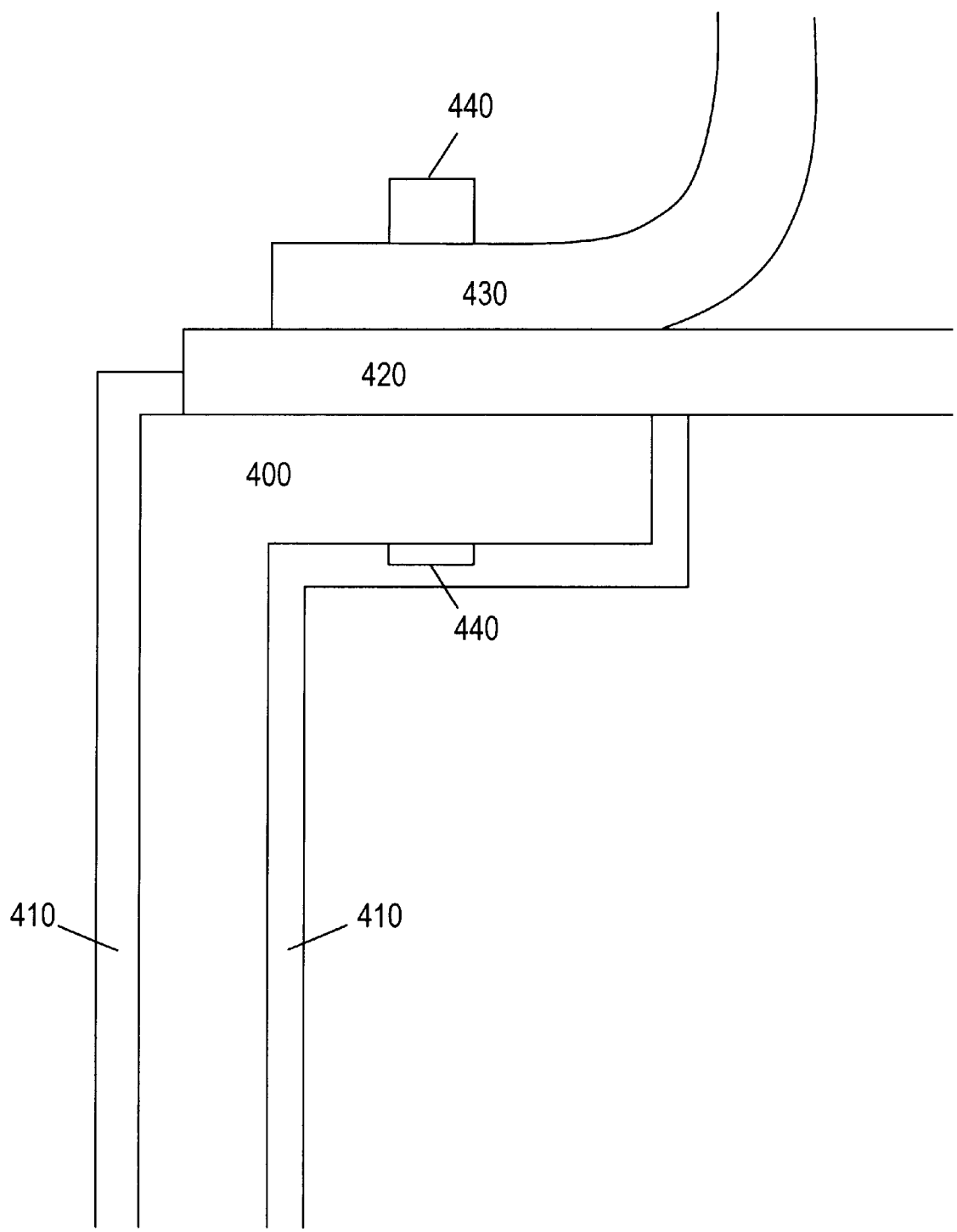
FIG. 4 is a block diagram of a section of a down-conductor removably attached by a conductive connecting bolt to an insulation-covered conductive post of a mobile object in accordance with one embodiment of the present invention.

FIG. 4 illustrates a section of a down-conductor removably attached by a conductive connecting bolt to an insulation-covered conductive post of a mobile object in accordance with one embodiment of the present invention. The post 400 of a mobile object is coated with a conductive material 410. The post 400 physically connects to a roof 420. A section of a down-conductor 430 is removably attached to the post 400 by a conductive connecting bolt (e.g., a metal bolt, screw, peg. Etc.) 440 that passes through the down-conductor 430, roof 420 and post 400. The conductive peg 440 also electrically connects the down-conductor 430 to the post 400.

Figure 5:
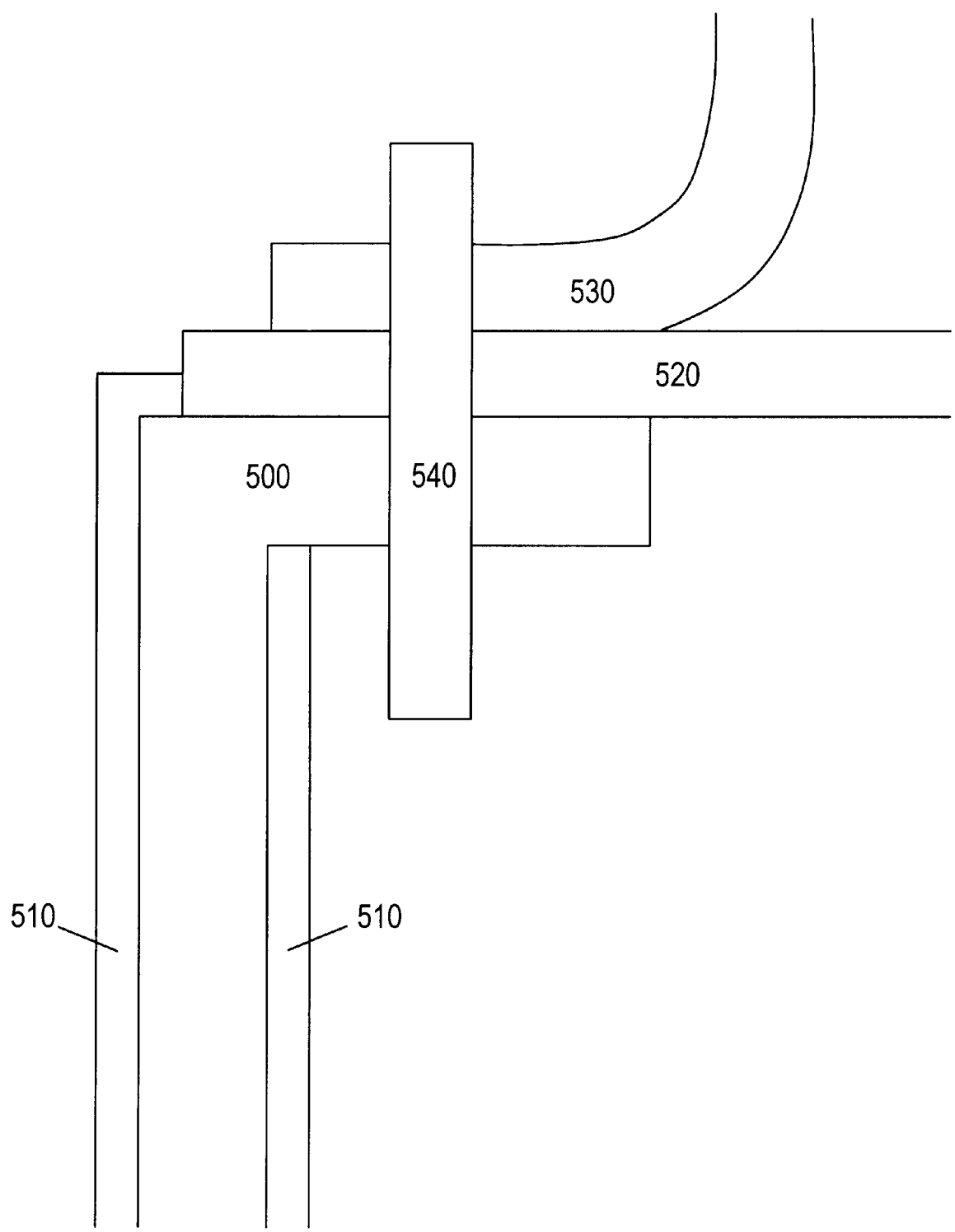
FIG. 5 is a block diagram of a section of a down-conductor removably attached by a conductive clamp to an insulation-covered conductive post of a mobile object in accordance with one embodiment of the present invention.

FIG. 5 illustrates a section of a down-conductor removably attached by a conductive clamp to an insulation-covered conductive post of a mobile object in accordance with one embodiment of the present invention. The post 500 of a mobile object is coated with a conductive material 500. The post 500 physically connects to a roof 520. A section of a down-conductor 530 is removably attached to the post 500 by a conductive clamp 540 that clamps the down-conductor 530, roof 520 and post 500 together. The conductive clamp 540 also electrically connects the down-conductor 530 to the post 500.

Figure 6:
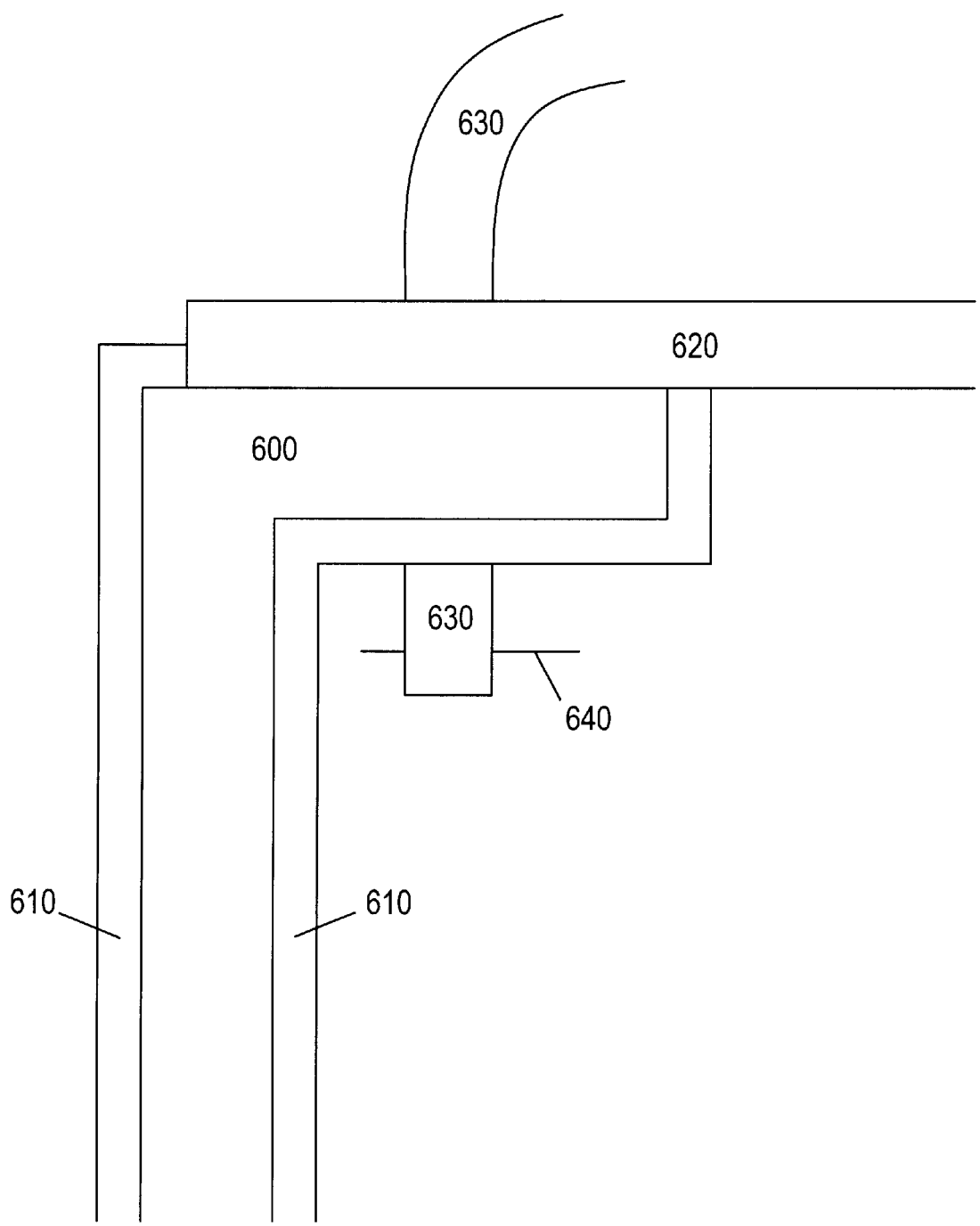
FIG. 6 is a block diagram of a section of a down-conductor removably attached directly to an insulation-covered conductive post of a mobile object and secured by a removable locking pin in accordance with one embodiment of the present invention.

FIG. 6 illustrates a section of a down conductor removably attached directly to an insulation-covered conductive post of a mobile object and secured by a removable locking pin in accordance with one embodiment of the present invention. The post 600 of a mobile object is coated with a conductive material 610. The post 600 physically connects to a roof 620. A section of a down-conductor 630 is removably attached directly to the post 600. Thus, the down-conductor passes through the roof 620 and the post 600 and is secured by a removable locking pin 640. The post 600 is electrically connected to the down-conductor 630.

Figure 7:
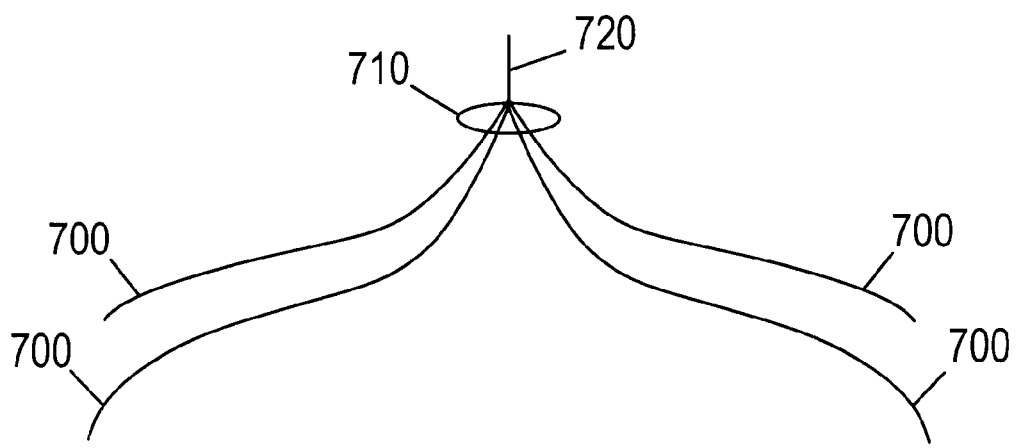
FIG. 7 is a block diagram of four down-conductors removably interconnected by a joining ring in accordance with one embodiment of the present invention.

FIG. 7 illustrates four down-conductors removably interconnected by a joining ring in accordance with one embodiment of the present invention. The down-conductors 700 are removably interconnected by a joining ring 710. The joined portions of the down-conductors 700 form a lightning interceptor 720.

Figure 8:
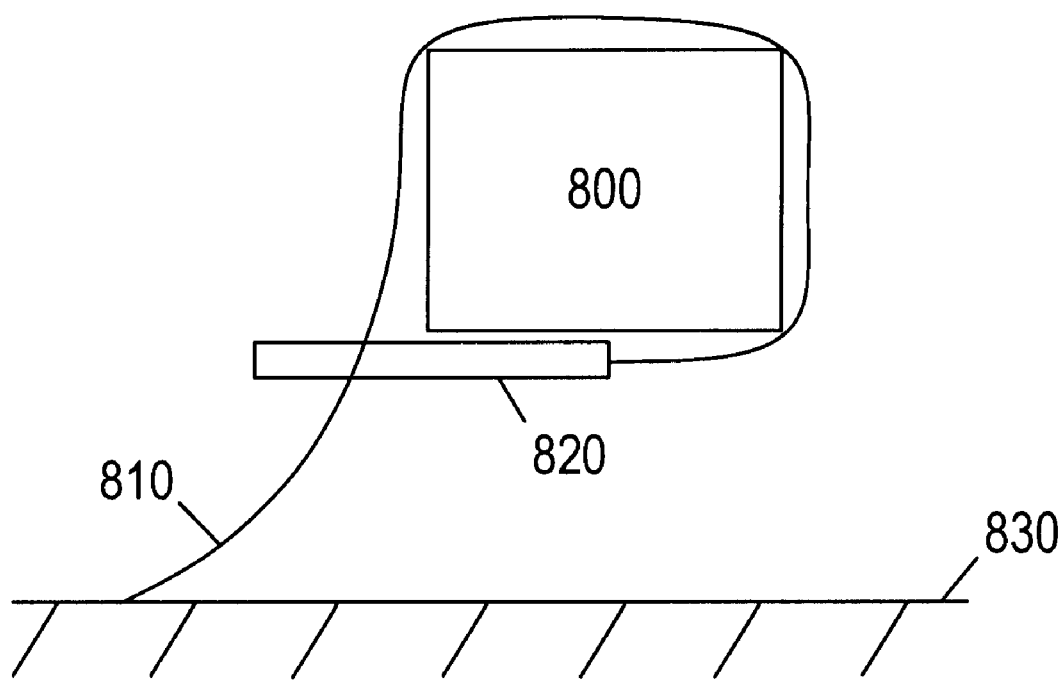
FIG. 8 is a block diagram of a flexible conductive material removably attached to the chassis of a mobile object such that the flexible conductive material electrically connects the ground to the chassis in accordance with one embodiment of the present invention.

FIG. 8 illustrates a flexible conductive material removably attached to the chassis of a mobile object such that the flexible conductive material electrically connects the ground to the chassis in accordance with one embodiment of the present invention. The chassis 800 is electrically connected to a flexible conductive material 810 that wraps around a portion of the chassis and is secured in place by a locking bolt 820. The flexible conductive material 810 contacts the ground 830, thus electrically connecting the chassis 800 and the ground 830.

Figure 9:
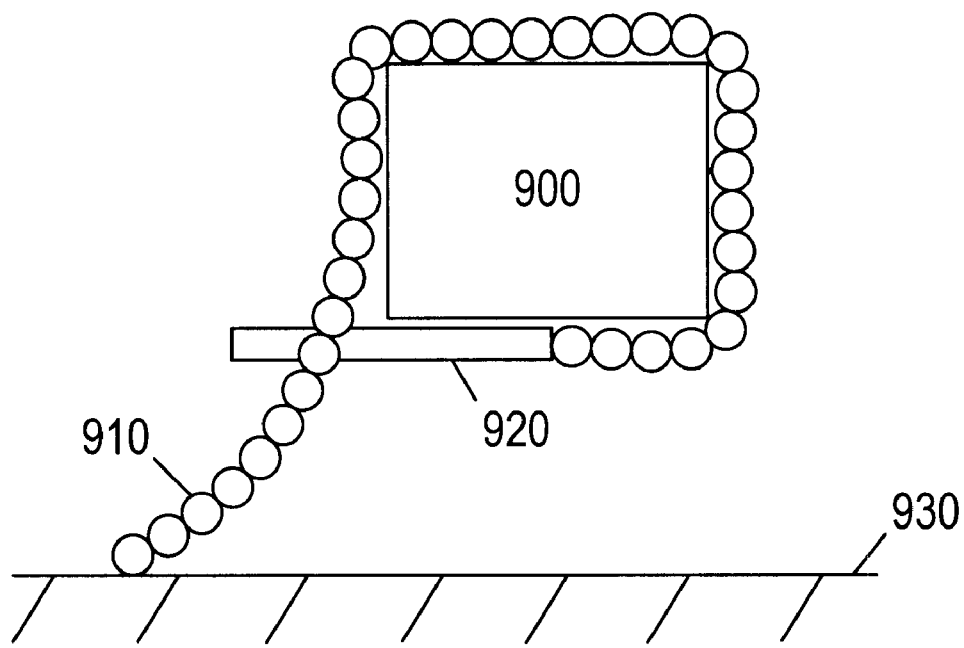
FIG. 9 is a block diagram of a conductive chain removably attached to the chassis of a mobile object such that the conductive chain electrically connects the ground to the chassis in accordance with one embodiment of the present invention.

FIG. 9 illustrates a conductive chain removably attached to the chassis of a mobile object such that the conductive chain electrically connects the ground to the chassis in accordance with one embodiment of the present invention. The chassis 900 is electrically connected to a conductive chain 910 that wraps around a portion of the chassis and is secured in place by a locking bolt 920. The conductive chain 910 contacts the ground 930, thus electrically connecting the chassis 900 and the ground 930.

Figure 10:
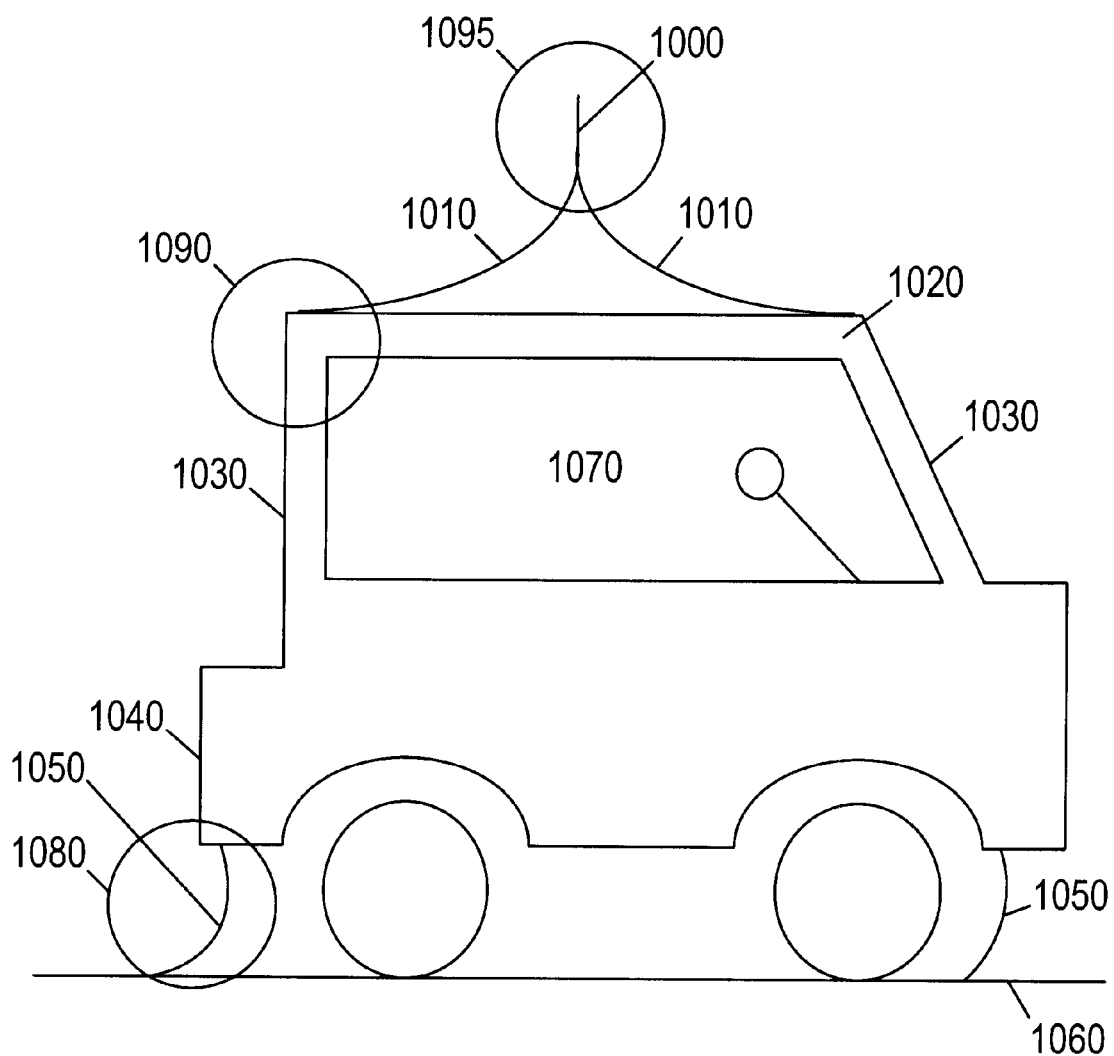
FIG. 10 is a block diagram of a mobile object with removably attached portions of down-conductors connecting the posts of the mobile object to a lightning interceptor and with removably attached flexible conductors connecting the chassis of the mobile object to the ground in accordance with one embodiment of the present invention.

FIG. 10 is a mobile object with removably attached portions of down-conductors connecting the posts of the mobile object to a lightning interceptor and with removably attached flexible conductors connecting the chassis of the mobile object to the ground in accordance with one embodiment of the present invention. A lightning interceptor 1000 is connected to conductive posts 1030 of the mobile object by down-conductors 1010. The conductive posts are already in place to support the roof 1020 of the mobile object, and the down-conductors 1010 are removably attachable.

The conductive posts 1030 attach to the chassis 1040 of the mobile object. The chassis 1040, conductive posts 1030 and roof 1020 define the volume 1070 in which passengers will be located. Flexible conductive material 1050 is removably attached to the chassis 1040 and connects the chassis 1040 to the ground 1060.

Region 1080, where flexible conductive material 1050 removably attached to the chassis 1040, is illustrated in more detail in FIG. 9. Region 1090, where down-conductors 1010 are connect with the conductive posts 1030, is illustrated in more detail in FIG. 6. Region 1095, where down-conductors 1010 are attached to a lightning interceptor 1000, is illustrated in more detail in FIG. 7.

I claim:

1. A method for protecting a person from lightning comprising:

positioning a lightning interceptor above a mobile object;

connecting said lightning interceptor to a first down-conductor;

removably connecting said first down-conductor to a chassis of said mobile object; and removably connecting a first flexible conductor to said chassis wherein said first flexible conductor is configured to contact the ground.

2. The method of claim 1 further comprising:

connecting said lightning interceptor to a second down-conductor;

connecting said lightning interceptor to a third down-conductor; and connecting said lightning interceptor to a fourth down-conductor.

3. The method of claim 2 wherein said first down-conductor, said second down-conductor, said third down-conductor and said fourth down-conductor are arranged in a rectangle.

4. The method of claim 3 wherein said first down-conductor is in a front-right corner of said mobile object, said second down-conductor is in a front-left corner of said mobile object, said third down-conductor is in a back-right corner of said mobile object and said fourth down-conductor is in a back-left corner of said mobile object.

5. The method of claim 1 wherein said first down-conductor is covered by an insulating material.

6. The method of claim 5 wherein said insulating material is a layer of polymer of at least three millimeter thickness.

7. The method of claim 1 further comprising:

connecting a second flexible conductor to said chassis wherein said second flexible conductor is configured to contact the ground.

8. The method of claim 7 wherein said first flexible conductor is connected to a front side of said mobile object and said second flexible conductor is connected to a back side of said mobile object.

9. The method of claim 1 wherein said first flexible conductor is a metallic chain.

10. The method of claim 1 wherein said first flexible conductor is detachable from said chassis.

11. The method of claim 1 wherein said lightning interceptor is detachable from said first down-conductor.

12. The method of claim 1 wherein a section of said chassis is covered by an insulating material.

13. The method of claim 12 wherein said insulating material is a layer of polymer of at least three millimeter thickness.

14. The method of claim 1 wherein said first down-conductor comprises:

a first section wherein said first section attaches to said lightning interceptor; and a second section wherein said second section attaches to said first section and said chassis.

15. The method of claim 14 wherein said first section is detachable from said second section.

16. A lightning protection system comprising:

a lightning interceptor configured to intercept a lightning strike wherein said lighting interceptor is positioned above a mobile object;

a first down-conductor configured to conduct a current supplied by said lightning strike wherein said first down-conductor is removably connected to said lightning interceptor;

a chassis of said mobile object wherein said chassis is connected to said first down-conductor and wherein said first down-conductor is removably connected to said chassis of said mobile object; and a first flexible conductor configured to contact the ground and to conduct said current to the ground wherein said first flexible conductor is removably connected to said chassis.

17. The lighting protection system of claim 16 further comprising:

a second down-conductor configured to conduct said current supplied by said lighting strike wherein said second down-conductor is connected to said lightning interceptor;

a third down-conductor configured to conduct said current supplied by said lightning strike wherein said third down-conductor is connected to said lightning interceptor; and a fourth down-conductor configured to conduct said current supplied by said lightning strike wherein said fourth down-conductor is connected to said lightning interceptor.

18. The lightning protection system of claim 17 wherein said first down-conductor, said second down-conductor, said third down-conductor and said fourth down-conductor are arranged in a rectangle.

19. The lightning protection system of claim 18 wherein said first down-conductor is in a front-right corner of said mobile object, said second down-conductor is in a front-left corner of said mobile object, said third down-conductor is in a back-right corner of said mobile object and said fourth down-conductor is in a back-left corner of said mobile object.

20. The lightning protection system of claim 16 wherein said first down-conductor is covered by an insulating material.

21. The lightning protection system of claim 20 wherein said insulating material is a layer of polymer of at least three millimeter thickness.

22. The lightning protection system of claim 16 further comprising:

a second flexible conductor configured to contact the ground and to conduct said current to the ground wherein said second flexible conductor is connected to said chassis.

23. The lightning protection system of claim 22 wherein said first flexible conductor is connected to a front side of said mobile object and said second flexible conductor is connected to a back side of said mobile object.

24. The lightning protection system of claim 16 wherein ad first flexible conductor is a metallic chain.

25. The lightning protection system of claim 16 wherein said first flexible conductor is detachable from said chassis.

26. The lightning protection system of claim 16 wherein said lightning interceptor is detachable from said first down-conductor.

27. The lightning protection system of claim 16 wherein a section of said chassis is covered by an insulating material.

28. The lightning protection system of claim 27 wherein said insulating material is a layer of polymer of at least three millimeter thickness.

29. The lightning protection system of claim 16 wherein said first down-conductor comprises:

a first section wherein said first section attaches to said lightning interceptor; and a second section wherein said second section attaches to said first section and said chassis.

30. The lightning protection system of claim 29 wherein said first section is detachable from said second section.

* * * * *